Sept. 8, 1953  C. L. HARLESS  2,651,342
NUT SHELLER
Filed Aug. 22, 1949
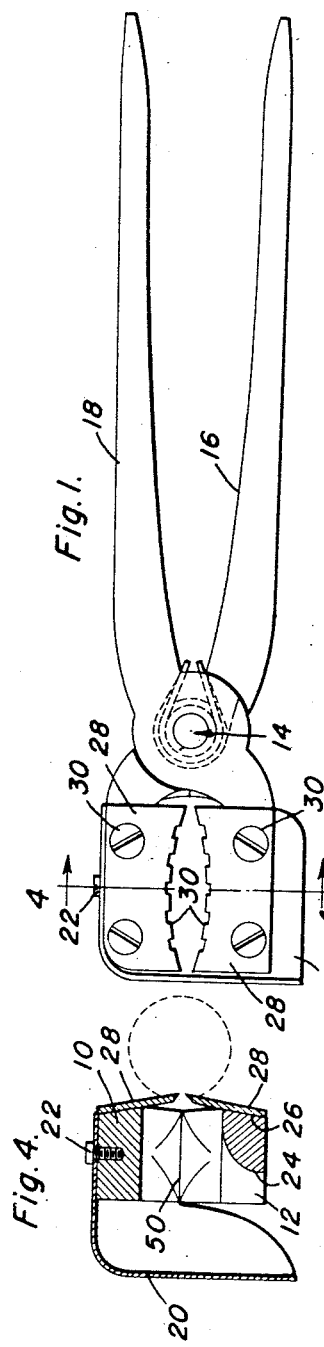
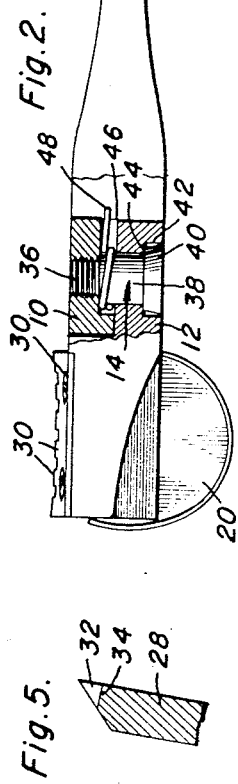
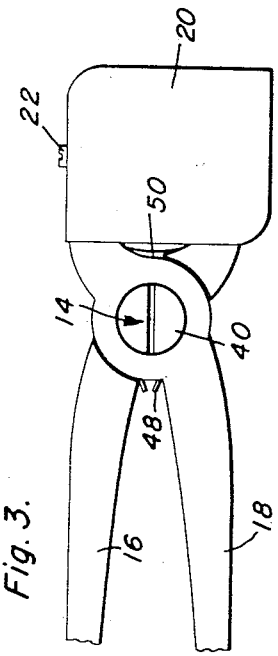
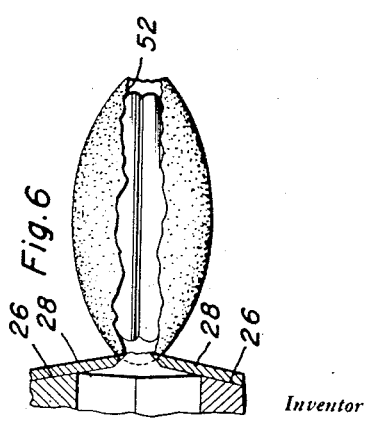
Inventor
Charles L. Harless
By Clarence A. O'Brien
and Harvey B. Jacobson
Attorneys Patented Sept. 8, 1953

2,651,342

UNITED STATES PATENT OFFICE 2,651,342

NUT SHELLER

Charles L. Harless, San Angelo, Tex., assignor to York Nut Sheller Co., Inc., San Angelo, Tex., a corporation of Texas Application August 22, 1949, Serial No. 111,609

3 Claims. (Cl. 146—13)

This invention relates generally to nut shellers, and more particularly to a nut sheller characterized by having cutting plates inclined outwardly and having novel cutting plate, jaw and pivot construction.

A primary object of this invention is to provide a nut sheller adapted to pinch off portions of the shell of a nut, such as a pecan nut, so that the shell can be parted from the meat without fracturing said meat.

Another object of this invention, closely allied to the preceding object, is to provide a nut sheller which allows the nut operated on to be held by the hand completely outside the jaws of the sheller, except for a small portion of the shell which is being pinched off, so that the process of shelling the nuts is simplified and facilitated, and the tendency for the meat to be inadvertently crushed is minimized.

Another object of this invention is to provide a cutter plate construction, together with cooperating jaw constructions, which will allow the easy replacement of the cutter plates when necessary, although the useful life of a set of cutter plates is very great in this nut sheller.

Another specific object of this invention is to provide a nut sheller in which neither the jaws nor the cutter plates meet when the sheller is in closed position, the non-meeting feature of the cutter plates being particularly important, inasmuch as this feature allows the cutter plates to be positioned on inclined planes adapting the cutter plates for their characteristic action in biting into the sides of nuts.

Yet another object of this invention is to provide a special tooth construction for the cutter plates, whereby a very strong cutting edge is acquired, it being noteworthy that the notches provided in the cutting edge are particularly designed with a view to preventing shifting of the nut rather than the provision of piercing teeth, since the action of this nut sheller is not primarily a shearing action but rather a pinching or wedging action.

Still another object of this invention is to provide a pivot construction adaptable for use with tools of this character, wherein the tendency for the pivot pin to loosen and become maladjusted is considerably lessened.

And a last object to be mentioned specifically provides a nut sheller which is inexpensive and practicable to manufacture, simple, safe and convenient to use, and which will give generally efficient and durable service.

With these objects definitely in view, this invention relies on certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of a nut sheller constructed according to this invention;

Figure 2 is a horizontal sectional view on a longitudinal center line in Figure 1;

Figure 3 is an elevational view of the nut sheller, taken from the side of the nut sheller opposite from the view in Figure 1;

Figure 4 is a vertical sectional view, taken on the line 4—4 in Figure 1;

Figure 5 is an enlarged fragmentary detail view of a portion of one of the cutter plates showing the tooth construction; and Figure 6 is a fragmentary view of the nut sheller and a nut being operated on, to illustrate the use of this invention.

Similar characters of reference designate similar or identical elements and portions throughout the specification and throughout the different views of the drawing.

Referring now to the drawings in detail, the illustrated embodiment of this invention includes a pair of opposing jaws 10 and 12 connected by a pivot generally indicated at 14 and the jaws may be integral with conventional handles 16 and 18. A shell deflector 20 will be secured to the jaw 10, as by means of a screw 22, and the other handle 12 is reduced in that portion thereof adjacent to the deflector 20, this reduction being indicated at 24 in Figure 4 and, of course, being designed to allow greater clearance for the shell fragments parted from a nut operated on by the sheller.

The jaws 10 and 12 are provided with inclined faces 26, and cutter plates 28 are secured on these inclined faces by screws 30, the cutter plates being each similar and generally flat, and the adjacent edges being curved, as best indicated in Figure 1, and sharpened.

The sharpened edge portions of the plates 28 are notched to provide teeth 32, the roots of the teeth having a transverse dimension, indicated by the line 34 in Figure 5, less than the transverse dimension of the cutter plate with which the tooth is integral. Furthermore, the width of the notches between the teeth 32 is kept at a minimum, so that the teeth will have maximum strength and durability. In this connection, it should be noted that the notching of the cutter plate 28 is primarily to provide means for preventing the slippage of the nut relative to the cutter plates, rather than the actual provision of teeth conceived as cutting members.

The specially designed pivot 14 comprises a pin having a threaded terminal portion 36 which will be tightly engaged in a suitably threaded bore in said one jaw, the remaining portions of the pivot pin including an intermediate shank 38 and a head 40. The other jaw 12 is provided with a recess 42 and the head 40 has a flat surface 44. The recess 42 is stepped so that the flat surface 44, disposed adjacent the said handle 10, represents the only and total bearing surface of the head 40 on the jaw 12. Provision of a clearance between the head 40 and the sides of the recess 42 makes it unnecessary for accurate machining to be accomplished on the head 40 and the recess 42, except as to the contacting surfaces at 44. Furthermore, the tendency for the pivot pin to become loosened and maladjusted is lessened.

The one jaw 10 is recessed as indicated at 46 in Figure 2 to receive a spring 48 which may be of substantially conventional character, as used to bias the handles of pliers and the like into open position. However, in the instant invention, the recess 46 is made sufficiently large so that tightening of the pivot pin 14 cannot cramp the spring 48, and the spring is constructed with a single turn thereof around the shank 38 of the pivot pin.

The operation of this invention will be clearly understood from a consideration of the foregoing description of the mechanical details thereof, taken in connection with the drawings and with the above recited objects of this invention. It will be clear from an examination of the figures that the cutter plates 28 do not meet when the nut sheller is closed. Furthermore, the jaws 10 and 12 do not meet in any portion thereof removed any considerable distance from the pivot pins 14, although the heel portions of the jaws 10 and 12 will abut, as indicated at 50 in Figure 3, when the handles are compressed together, thus limiting the inward movement of the jaws and handles, against the action of the spring 48. Furthermore, the present nut sheller is particularly adapted for removing a portion of the shell of a nut, such as a pecan, as illustrated at 52 in Figure 6, in which figure there is illustrated a pecan nut with a strip of the shell removed in a manner clarified by the said figure, that is, by a pinching action. Ordinarily, the nut can be held in one hand and the sheller held in the other, so that the shelling of nuts is facilitated and simplified, and the tendency for inexpert persons to crush the meat of the nut is practically eliminated.

Obviously, minor variation from the embodiment disclosed may be made without departure from the spirit of this invention, the scope of this invention being determined by the terminology used in the subjoined claims.

Having described the invention, what is claimed as new is:

1. A nut sheller comprising a pair of handles crossed and pivotally connected at one of their ends; longitudinally elongated, opposed jaws integral with the pivoted ends of said handles; said jaws comprising an upper jaw and a lower jaw; said upper jaw having a side face and said lower jaw having a side face under the side face of the upper jaw; upper and lower anticlinal blades removably secured to the side faces of the upper and lower jaws; said upper blade having a lower sharpened beveled longitudinally extending concave edge and the lower blade having an upper sharpened beveled longitudinally extending concave edge; the beveled edge of said upper blade being downwardly and outwardly beveled and the beveled edge of said lower blade being upwardly and outwardly beveled; the extremities of said beveled edges lying in a common plane that is parallel to and spaced to one side of a plane on which the longitudinal axes of the jaws lie throughout movement of the jaws toward and away from each other, whereby the beveled edges of the blades will coact in pinching a shell.

2. A nut sheller comprising a pair of handles crossed and pivotally connected at one of their ends; longitudinally elongated, opposed jaws integral with the pivoted ends of said handles; said jaws comprising an upper jaw and a lower jaw; said upper jaw having a downwardly and outwardly sloping side face and said lower jaw having an upwardly and outwardly sloping side face under the sloping side face of the upper jaw; upper and lower flat blades removably secured to the sloping side faces of the upper and lower jaws; said upper blade having a lower sharpened beveled longitudinally extending concave edge and the lower blade having an upper sharpened beveled longitudinally extending concave edge; the beveled edge of said upper blade being downwardly and outwardly beveled and the beveled edge of said lower blade being upwardly and outwardly beveled; the extremities of said beveled edges lying in a common plane that is parallel to and spaced to one side of a plane on which the longitudinal axes of the jaws lie throughout movement of the jaws toward and away from each other, whereby the beveled edges of the blades will coact in pinching shell.

3. The combination of claim 1 wherein each of said beveled edges is provided with a series of spaced notches defining edges for gripping a shell placed between the beveled edges to prevent slippage of the shell as the blades are moved toward each other.

CHARLES L. HARLESS.

References Cited in the file of this patent

UNITED STATES PATENTS

| Number | Name | Date |
| --- | --- | --- |
| 1,134,265 | Harper | Apr. 6, 1915 |
| 1,371,072 | Craig | Mar. 8, 1921 |
| 1,922,884 | De Golyer | Aug. 15, 1933 |
| 2,204,040 | Himes | June 11, 1940 |
| 2,376,469 | York | May 22, 1945 |
| 2,378,084 | Jackson | June 12, 1945 |
| 2,454,601 | Gallagher | Nov. 23, 1948 |